March 29, 1966     P. AEMMER     3,243,726
CRYSTAL OSCILLATOR HAVING PLURAL, SELECTABLE
FEEDBACK PATHS AND ADJUSTABLE FREQUENCY
DETUNING MEANS
Filed July 1, 1963
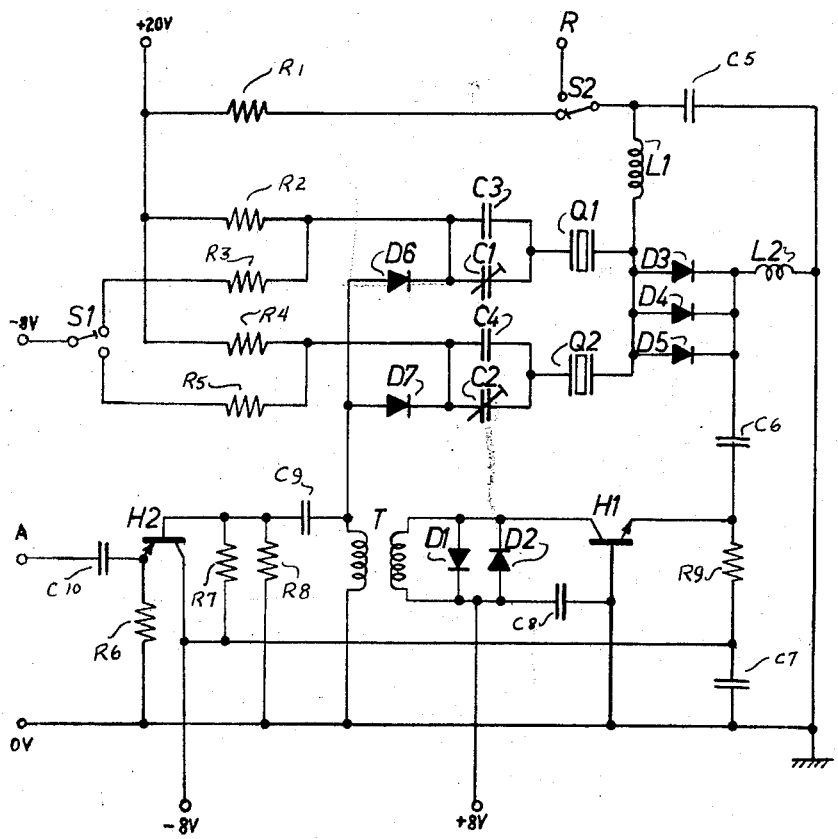
INVENTOR:
PETER AEMMER
BY: McGlew and Toren
ATTORNEYS

United States Patent Office 3,243,726
Patented Mar. 29, 1966

3,243,726
CRYSTAL OSCILLATOR HAVING PLURAL, SELECTABLE FEEDBACK PATHS AND ADJUSTABLE FREQUENCY DETUNING MEANS
Peter Aemmer, Zurich, Switzerland, assignor to Albiswerk Zurich A.G., Zurich, Switzerland
Filed July 1, 1963, Ser. No. 291,950
Claims priority, application Switzerland, July 27, 1962, 9,017/62
4 Claims. (Cl. 331—161)

This invention pertains, in general, to the measurement of distances by utilizing the detected audio range frequency difference between two transmitter-receiver units which are located at opposite extremities of the path, or distance, to be measured and radiate electromagnetic energy of different wave lengths; and, more particularly, to a new and improved distance measuring system employing two crystal-controlled transmitter-receiver units which are situated at respective opposite ends of the path to be measured and wherein each unit is capable of selectively transmitting electromagnetic energy at different fixed frequencies, each unit including circuitry for deriving the audio range frequency difference between the electromagnetic waves transmitted by the units.

According to a known distance measuring system employing electromagnetic wave energy, two transmitter-receiver units are located at opposite ends of the path to be measured. Each transmitter-receiver unit radiates electromagnetic waves (measuring waves) independently. The frequencies of the radiated measuring waves differ from each other by a frequency difference which is in the audio range. The transmitted measuring waves of both transmitter-receiver units are mixed in the receiver portions of the units and a difference oscillation is filtered out. In one of the units the difference oscillation is divided by a factor. Then the difference oscillation so divided is superimposed on the measuring wave transmitted from this unit. However, in the other unit, which is remotely located, this frequency-divided superimposed oscillation is received and multiplied by the same factor so that the resulting frequency of oscillation is of the same frequency as the difference oscillation generated there. Both difference oscillations are then fed to a phase measuring stage wherein the measured distance may be determined from the phase difference between the difference oscillations.

In the system just described, the transmitted wave energy is directly employed as the measuring waves for the purpose of measuring the unknown distance. The transmission frequency of these measuring waves can be selected either to give efficient wave propagation characteristic or to give efficient distance measurement.

According to another known prior art system, carrier waves may be modulated by the measuring waves so that optimum wave propagation and highly accurate distance measurement results.

According to another known system, frequency modulation is employed. After mixing the modulating wave and the carrier wave and passing the resultant wave through a band pass filter, the difference oscillation of the measuring wave is derived as the amplitude modulation on the difference oscillation of the carrier waves. The carrier wave at the remote unit, which has been modulated by the measuring wave, is additionally pulse-modulated with pulses which characterize the phase position of the difference oscillation. The transferred difference oscillation of the measuring waves may, therefore, be separated and detected in the main transmitter-receiver unit and subsequently compared with the difference oscillation generated within the main unit.

In the prior art, the two units which are used for measuring the distance may be considered as the main unit and the auxiliary unit. The main unit includes circuitry for phase measurement while the auxiliary unit includes circuitry for modulating the measuring wave by the difference oscillation.

With known prior art distance measuring apparatus, such as those hereinbefore described, measurement of the sides of a triangle in a triangulation method causes some difficulty. At least two units have to be situated at each measuring point; i.e., a main unit and an auxiliary unit so that all three sides of the triangle can be measured without having to interchange all of the measuring units.

Also, present day distance measuring devices have to meet high requirements with regard to their resolution power. For this purpose, several measuring waves, each having a different frequency, are employed so that the distance may be measured uniquely; i.e., so that no ambiguities result. In a known crystal-controlled system, employing a main transmitter-receiver unit and an auxiliary transmitter-receiver unit, a total of eight piezoelectric crystal resonators are required; four in the main unit and four in the auxiliary unit so that a resolution may be obtained which will enable the accurate determination of distances ranging from several kilometers down to a few centimeters.

One object of the present invention is to provide new and improved distance measuring apparatus.

Another object of the present invention is to provide a new and improved transmitter-receiver unit, which may be used as either a main unit or an auxiliary unit.

Another object of the present invention is to provide highly accurate distance measuring apparatus having a high degree of resolution.

Another object of the present invention is to provide distance measuring apparatus which is relatively simple, highly reliable and economical.

According to the invention there is provided a transmitter-receiver unit which may be used as either the main unit or the auxiliary unit. When used as the main unit, an oscillator, included in the unit, generates a measuring wave characterised by a first frequency. When used as the auxiliary unit, the measuring wave oscillates at a second frequency, differing from the first frequency by an audio frequency. For this purpose each of the two transmitter-receiver units are fitted with one piezoelectric resonator of the same resonant frequency. Switching means are provided for switching a frequency detuning circuit to shift the resonant frequency of the piezoelectric resonator for an amount of audio frequency. A second switching means is included for switching either one of two resonant circuits for resolving ambiguity problems.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there are illustrated and described a preferred embodiment of the invention.

One embodiment of the invention is illustrated in the accompanying drawing; the circuitry there illustrated being one transmitter-receiver unit which may, selectively, be used as either the main unit or the auxiliary unit.

The output frequency of the oscillator is fed to a terminal A, which is connected with the emitter electrode of a PNP transistor H2 by means of the capacitor C10 which is connected in series between the terminal A and the emitter electrode. The function of the transistor H2 is to uncouple the load from the oscillating stage. The emitter electrode of the transistor H2 is connected to a source of zero (ground) potential by means of a resistor R6. The collector electrode of the transistor H2 is connected to a source of negative voltage; e.g., —8 volts, as illustrated. As shown, the base electrode of the transistor H2, is connected to one side of a secondary winding of a transformer, which is designated generally by the reference letter T; the base electrode of transistor H2 being coupled with the transformer secondary winding by virtue of the capacitor C9 which is situated in series between the base electrode and the transformer winding. A resistor R7 is connected between the base eltctrode of transistor H2 and the source of negative voltage. Also, a resistor R8 is connected between the base electrode of the transistor H2 and ground potential. The other side of the secondary winding of the transformer T is connected to ground. A capacitor C7 is connected between the negative voltage source and ground potential.

A NPN transistor H1 and the associated circuit elements, hereinafter described, form the oscillator of the subject transmitter-receiver unit. The base electrode of the transistor H1 is directly connected to ground potential. Between the ground potential and the collector electrode of transistor H1 there is connected in series a capacitor C8 and the primary winding of the transformer T. As shown, two diodes D1 and D2 are connected in parallel across the primary winding of the transformed T. The two diodes D1 and D2 are oppositely poled, as illustrated. A lead connected between the capacitor C8 and one side of the primary winding of the transformer T is connected with a positive voltage source; e.g., +8 volts, as illustrated. The diodes D1 and D2 are clamping or amplitude-limiting diodes. The emitter electrode of the transistor H1 is connected to the negative voltage source by a resistor R9.

Serially connected between the emitter electrode of the transistor H1 and three parallel-connected variable capacitance diodes D3, D4 and D5 is a capacitor C6. The three variable capacitance diodes D3, D4 and D5 are connected in parallel, as shown, and each of these diodes is polled for conduction in the same direction. Serially connected between the three parallel-connected variable capacitance diodes and ground potential is a choke coil L2.

A first series circuit, comprising a diode D6, a variable capacitor C1 and a quartz crystal Q1, is connected between one side of the secondary winding of the transformer T, and the three parallel-connected variable capacitance diodes D3, D4 and D5. In this first series circuit, a fixed capacitor C3 is connected in parallel with the variable capacitor C1. Also, as shown, a second series circuit, comprising the diode D7, the variable capacitor C2 and the quartz crystal Q2, is connected between one side of the secondary winding of the transformer T and the bank of parallel-connected variable capacitance diodes D3, D4 and D5. A fixed capacitor C4 is connected in parallel with the variable capacitor C2.

Another choke coil L1 has one of its ends connected between the two quartz crystals Q1 and Q2 and the parallel-connected variable capacitance diode bank D3, D4 and D5. The other end of the choke coil L1 is connected to a switch S2. As shown, a capacitor C5 is connected in series between one end of the choke coil L2 and one end of the choke coil L1.

One fixed contact of the switch S2 is directly connected to an adjustable source of negative voltage which is designated generally by the reference letter R. The other fixed contact of switch S2 is connected through a series resitsor R1 with a source of positive potential; e.g., +20 volts, as illustrated. This source of positive potential is also connected with one plate of the fixed capacitor C3 through an intermediate series resistor R2 and to one plate of the fixed capacitor C4 through an intermediate series resistor R4.

A source of negative potential (e.g., −8 volts) is connected with a switch S1, as shown. One end of a resistor R3 is connected between the resistor R2 and the fixed capacitor C3, the other end of the resistor R3 being connected to one fixed contact of the switch S1. Similarly, one end of a resistor R5 is connected between the resistor R4 and the fixed capacitor C4. The other end of the resistor R5 is connected to another fixed contact of the switch S1.

The oscillator circuit of the transmitter-receiver unit is comprised of the transistor H1, the piezoelectric resonators Q1, Q2 and the amplitude-limiting, or clamping, diodes D1 and D2. The signal is coupled to the output terminal A through the buffer stage comprising the transistor H2 via the transformer T. Adjustment of the resonant frequency of the oscillator is asompished by adjusting the variable capacitors C1 and C2, which are connected with the fixed capacitors C3 and C4 in parallel. Adjustment of the variable capacitors C1 and C2 permits fine adjustment of the range of desired oscillation frequencies.

The variable capacitance diodes D3, D4 and D5 are elements of the frequency detuning circuit.

The choke coils L1 and L2 are for the purpose of uncoupling the high frequency oscillations for the direct current path.

The switch S1 is for the purpose of switching either of the piezoelectric resonators Q1 or Q2 into the oscillator feedback circuit so that the resonator Q1 may function in conjunction with the diode D6, or so that the resonator Q2 may function with the diode D7.

The switch S2 is employed for the purpose of changing the frequency of the measuring wave for operation of the transmitter-receiver unit as either a main unit or as an auxiliary unit.

With the switches S1 and S2 in the positions indicated in the drawing, the quartz crystal Q1 is switched into the feedback circuit and the transmitter-receiver unit operates as a main unit. In such a condition, the emitter of transistor H1 receives high frequency alternating current from the piezoelectric resonator Q1 through the variable capacitance diodes D3, D4 and D5. These diodes, being poled as shown in the drawing figure, have a very low impedance in their forward conduction direction and thus pass the high frequency current in both directions. Alternating current appears at the collector electrode of the transistor H1 which acts as a high impedance current source. As a consequence, a high frequency alternating potential builds up in the transformer T. The amplitude of this high frequency alternating potential is determined by the threshold of the clamping diodes D1 and D2. The oscillator feedback path is completed through the diode D6 and the parallel-connected capacitors C1 and C3.

When the switch S1 is transferred to the other fixed contact the piezoelectric resonator Q2 is switched into the feedback circuit. The tuned oscillation frequency then is determined by the value of the capacitors C2 and C4. In this condition, the oscillator's feedback circuit is closed via the diode D7 and the parallel connected capacitors C2 and C4. The circuit action is the same as when the piezoelectric resonator Q1 is in the circuit as hereinbefore discussed.

When the switch S2 is transferred, so that it is connected with the negative voltage from the voltage source R, the transmitter-receiver unit is operable as an auxiliary unit. As a consequence of reversing the switch S2, the direct current from the positive voltage source (+20 volts) is switched out of the circuit and the negative voltage from the input source R is switched into the circuit. This negative voltage may be supplied by an automatic frequency control circuit. With this negative biasing voltage, the variable capacitance diodes D3, D4 and D5 act as a variable capacitor. Since the capacitance of one diode is generally not sufficient, several of them may be connected in parallel in order to obtain the required frequency difference.

For obtaining a large tuning range, the variable capacitance diode is to be controlled over a wide range. This results in a small bias so that the capacitance of the diode is affected by a great ohmic loss. However, this action may be reduced by connecting several such diodes in parallel.

For the purpose of changing or reversing the operation of the subject transmitter-receiver unit from that of a main unit to one of an auxiliary unit at a fixed frequency, a suitable reactance, such as a capacitor, may be connected in parallel with a switching diode having a suitable number of corresponding biasing potential sources associated therewith.

With the arrangement hereinbefore described, it is possible to measure distances with a very high degree of accuracy. The errors which are occasioned by frequency drift of the quartz resonators remain within smaller ranges than the errors which occur due to atmospheric influence causing expansion of the quartz crystals.

While a specific embodiment of the invention has been shown and described in detail to illustrate the application of the inventive principles, it will be understood that the invention may be embodied otherwise without departing from such principles.

What is claimed is:

1. In apparatus for measuring distance by transmitting electromagnetic waves of different frequencies from respective opposite ends of a distance to be measured, with the frequency difference between the transmitted waves being in the audio range, and using a main transmitter-receiver unit at one end of the distance to be measured and an auxiliary transmitter-receiver unit at the other end of such distance; an oscillator selectively usable with either the main transmitter-receiver unit or the auxiliary transmitter-receiver unit, said oscillator comprising, in combination: a transistor having a collector, base and emitter; a transformer having a primary winding and a secondary winding, one side of said primary winding being connected to said collector; a first capacitor serially connected between the other side of said primary winding and said base; amplitude limiting means connected in parallel with said primary winding; a first positive voltage source connected to said other side of said primary winding; a second source of ground potential connected to said base and to one side of said secondary winding; first impedance means connected between said emitter and said source of ground potential; a plurality of variable capacitance diodes connected in parallel; a second capacitor serially interconnected with said parallel-connected variable capacitance diodes to said emitter; first and second parallel-connected feedback circuits, each including a piezoelectric resonator connected between the other side of said secondary winding and said parallel-connected variable capacitance diodes; a second positive voltage source; second impedance means for coupling said second positive voltage source to each of said resonators; a first negative voltage source; first switch means connected to said first negative voltage source and to said second impedance means and operable to selectively connect said first negative voltage source with either of said resonators through the respective second impedance means; a second source of negative voltage; and a second switch means connected to said variable capacitance diodes and to said second positive voltage source and to said second source of negative voltage, and selectively operable to connect said variable capacitance diodes either to said second positive voltage source or to said second source of negative voltage.

2. In apparatus for measuring distance by transmitting electromagnetic waves of different frequencies from respective opposite ends of a distance to be measured, with the frequency difference between the transmitted waves being in the audio range, to obtain a rough measurement, and transmitting a second series of electromagnetic waves of different and higher frequencies but having the same frequency difference in the audio range, to obtain a fine measurement, and using a main transmitter-receiver unit at one end of the distance to be measured and an auxiliary transmitter-receiver unit at the other end of such distance: the improvement comprising a single signal generator usable in either of said units; said signal generator including a pair of piezo-electric resonators having substantially the same resonance frequency; the pair of resonators in said signal generator being included in an oscillator circuit further including a pair of feedback circuits each connected with a respective resonator and each feedback circuit including respective frequency-adjusting means for the associated resonator; the two feedback circuits of said oscillator being tuned to slightly different frequencies; said oscillator circuit further including adjustable frequency detuning circuit means; a signal output terminal; a buffer amplifier coupled between said output terminal and said feedback circuits; said oscillator including a first, negative potential source, a first switch means connected to said first negative potential source and to said feedback circuits and selectively operable to connect either one of said feedback circuits to said first negative potential source, a second potential source having a positive terminal connected to said feedback circuits, and a third potential source having a negative terminal; and second switch means connected to the positive terminal of said second potential source, the negative terminal of said third potential source and in common to said detuning circuit means and said resonators, and selectively operable to connect said detuning circuit means and said resonators to either the positive terminal of said second potential source or the negative terminal of said third potential source, to selectively detune said oscillator.

3. Circuitry as defined in claim 2, wherein said frequency detuning circuit means includes variable capacitance diodes connected in parallel.

4. Circuitry as defined by claim 3, wherein said parallel-connected diodes function as a variable capacitor to automatically control the frequency difference.

References Cited by the Examiner

UNITED STATES PATENTS

| | | | |
|---|---|---|---|
| 1,984,424 | 12/1934 | Osnos | 331—162 X |
| 3,054,967 | 9/1962 | Gindi. | |
| 3,068,427 | 12/1962 | Weinberg | 332—30 |

FOREIGN PATENTS

| | | |
|---|---|---|
| 1,090,727 | 10/1960 | Germany. |
| 1,105,481 | 4/1961 | Germany. |
| 836,782 | 6/1960 | Great Britain. |
| 236,992 | 6/1959 | Australia. |

ROY LAKE, *Primary Examiner.*

JOHN KOMINSKI, *Examiner.*

J. B. MULLINS, *Assistant Examiner.*